United States Patent [19]

Calvin

[11] 4,135,971
[45] Jan. 23, 1979

[54] HYDRAULIC HOLD-DOWN FOR NUCLEAR REACTOR FUEL

[75] Inventor: John N. Calvin, West Simsbury, Conn.

[73] Assignee: Combustion Engineering, Inc., Windsor, Conn.

[21] Appl. No.: 784,189

[22] Filed: Apr. 4, 1977

[51] Int. Cl.² .............................................. G21C 15/00
[52] U.S. Cl. .................................. 176/50; 176/36 R; 176/61
[58] Field of Search ................... 176/50, 61, 87, 36 R, 176/86 R, 38, 78

[56] References Cited

U.S. PATENT DOCUMENTS

| | | | |
|---|---|---|---|
| 3,235,465 | 2/1966 | McDaniel et al. | 176/61 |
| 3,383,287 | 5/1968 | Jackson | 176/50 |
| 3,392,087 | 7/1968 | Braun et al. | 176/61 |
| 3,479,250 | 11/1969 | Ripley | 176/36 R |
| 3,549,493 | 12/1970 | Germer | 176/50 |
| 3,666,624 | 5/1972 | Finch et al. | 176/50 |
| 3,770,583 | 11/1973 | Klumb et al. | 176/76 |
| 3,801,734 | 4/1974 | West | 176/50 |
| 3,816,245 | 6/1974 | Bevilacqua | 176/61 |
| 4,006,055 | 2/1977 | Knodler et al. | 176/61 |

FOREIGN PATENT DOCUMENTS 1012433  12/1965  United Kingdom ...................... 176/50

Primary Examiner—Harvey E. Behrend
Attorney, Agent, or Firm—Edward L. Kochey, Jr.

[57] ABSTRACT

A fuel assembly for a nuclear reactor has a pressure plate attached to the upper or lower end thereof. The side of the pressure plate adjacent the fuel elements is exposed to the ambient pressure of the reactor coolant. The alternate side of the pressure plate is exposed to a pressure from another location in the reactor, selected so that the pressure above the pressure plate is greater than that below the pressure plate.

7 Claims, 5 Drawing Figures

HYDRAULIC HOLD-DOWN FOR NUCLEAR REACTOR FUEL

BACKGROUND OF THE INVENTION

This invention relates to nuclear reactors and in particular to an apparatus for holding down fuel assemblies within the reactor core.

In pressurized water reactors the coolant flow rate and fuel assembly flow resistance are such that the hydraulic uplift force is of sufficient magnitude to cause the assemblies to jitter and even lift off the core support structure. Various approaches have been used to eliminate this detrimental movement.

One suggested solution involves the use of a lock down device which attaches the lower end of the fuel assemblies to the core support structure. While this device will function properly, it does introduce mechanical complexity since the device must not only lock and unlock remotely, but it must release reliably after a year of operation in the reactor environment.

Another approach has been to use springs located above each fuel assembly which bear against an upper alignment plate, thereby urging the fuel assemblies down. As reactors have been designed with increasingly large hydraulic uplift forces the spring force has become very large. The springs themselves have become so large that an excessively large plenum is required between the alignment plate and the upper end fitting of the fuel assembly. The springs at this location produce an undesirable flow pattern and an excessively high pressure drop through the plenum. They are also potentially subject to flow induced vibration since the total reactor coolant passes over these springs.

SUMMARY OF THE INVENTION

It is an object of the invention to hold-down fuel assemblies in a simple uncomplicated manner which will eliminate or reduce the need for spring hold-down forces. It is a further object to introduce these forces in a manner which will compensate for variations in primary flow through the reactor.

These and other objects are achieved in the invention by attaching to the fuel assembly, at either end, a pressure plate. The pressure plate is horizontally coextensive with the fuel assembly and has the side of the plate adjacent the fuel assembly exposed to the reactor fluid pressure existing in that area. The other side of the pressure plate is exposed to a pressure from another location in the reactor vessel. The pressure are selected so that the higher pressure is always above the pressure plate, thereby resulting in a downward force on the fuel assembly.

Where the pressure plate is located above the fuel assembly the high pressure is preferably obtained from a location where the coolant enters the reactor vessel. Alternately this pressure may be obtained from a location at the bottom of the core. Where the pressure plate is located below the fuel assembly the low pressure is obtained by connecting this area to a portion of the fluid flow path near the outlet from the reactor.

A pressurizable plenum is formed on the side of the sealing plate away from the fuel assemblies by providing a sealing arrangement between extensions on the sealing plate and a support plate or alignment plate which is adjacent thereto. Spring means to supplement the hold-down force may be used since they are compatible with the hydraulic structure and they may be of lesser magnitude than the prior art structure where the spring means supplied the entire hold-down force.

Various other objects and advantages will appear from the following description of the embodiments of the invention, and the novel features will be particularly pointed out in connection with the appended claims.

DESCRIPTION OF THE PREFERRED EMBODIMENTS

Figure 1:
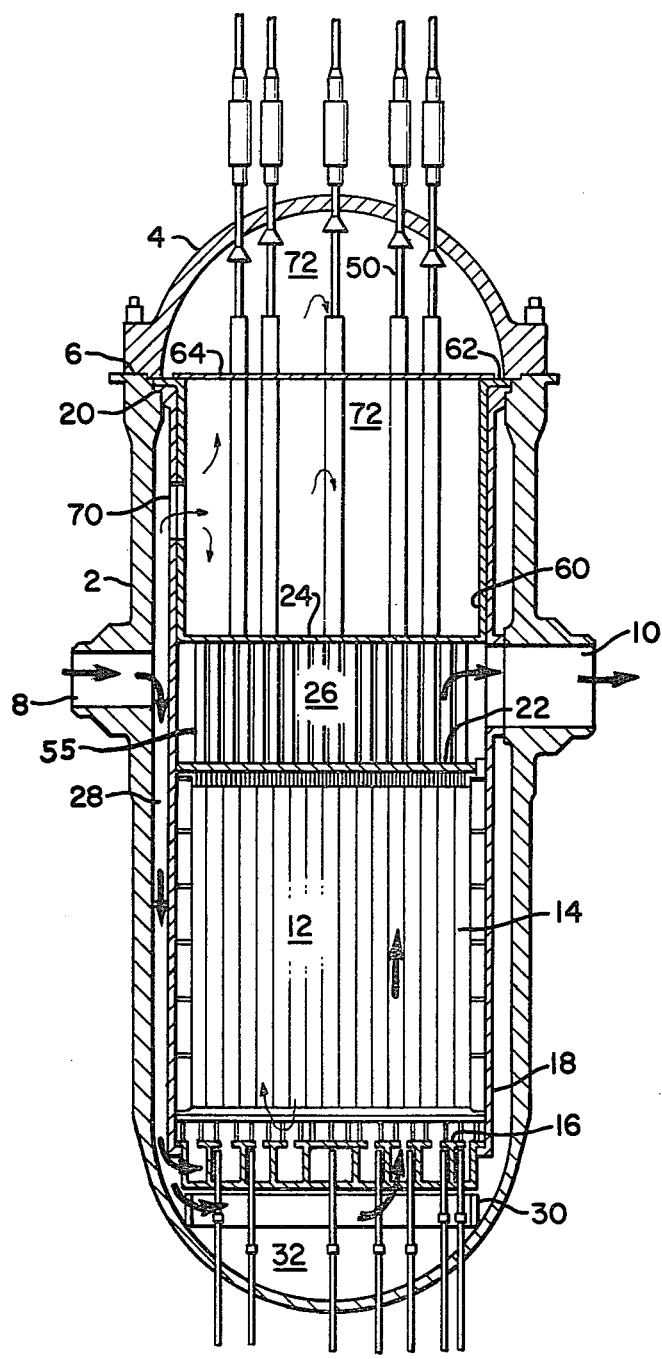
FIG. 1 is a sectional elevation of a general arrangement of a nuclear reactor which illustrates the general structure and the flow paths therethrough.
Figure 2:
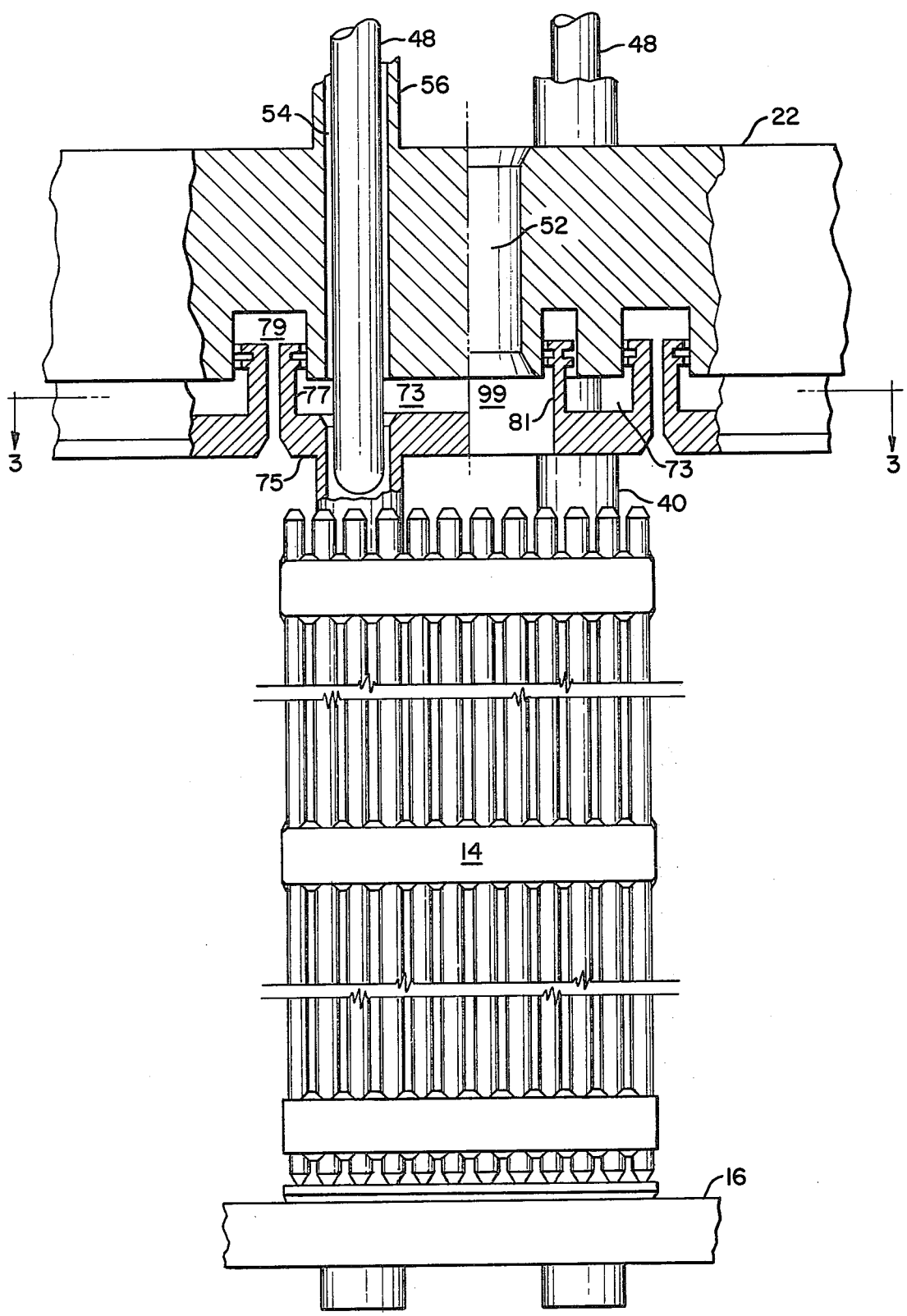
FIG. 2 is a sectional view through section 2—2 of FIG. 3 illustrating a fuel assembly and the hydraulic hold-down therefore.
Figure 3:
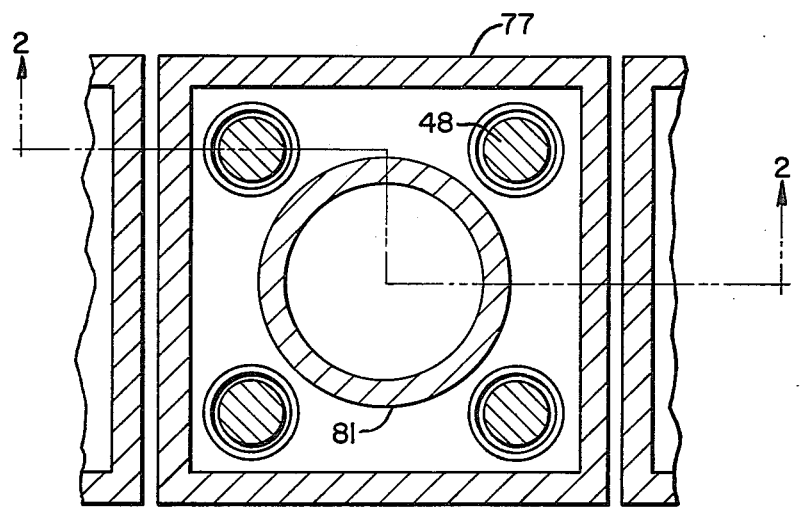
FIG. 3 is a sectional plan view of the fuel assembly taken through 3—3 of FIG. 2.

A reactor vessel body 2 and a reactor vessel head 4 are joined by bolted connection at flange 6. The reactor vessel body has an inlet opening 8 and an outlet opening 10 for flow of coolant water therethrough.

A core 12 is comprised of a plurality of fuel assemblies 14, each of which is comprised of a plurality of elongated fuel rods. The core is supported on the core support assembly 16 which is in turn supported by the core support barrel 18. This core support barrel is supported by flange 20 from the reactor vessel body 2 at a location adjacent the flange 6.

Immediately above the core 12 is a fuel assembly alignment and seal plate 22 which serves to engage the upper ends of the fuel assemblies and to maintain alignment thereof. A boundary plate structure 24 is located above the alignment plate, thereby defining the outlet plenum 26.

After the coolant enters through inlet opening 8 a first quantity comprising the bulk of the flow passes downwardly through the annular space 28 between the reactor vessel and the core support barrel. This flow passes downwardly through the flow skirt 30 into an inlet plenum 32 located below the core 12. The flow passes upwardly through the core and through openings 52 in the alignment plate 22 into the outlet plenum 26. From here the flow passes out through outlet opening 10 to a steam generator (not shown).

Each of the fuel assemblies 14 contain within their structure four control rod guide tubes 40 which pass through the entire length of the fuel assembly.

Finger shaped control rods 48 are vertically movable within the guide tubes 40 of the fuel assemblies. Each of these rods individually extends to an elevation above the boundary plate 24 at which location they may be joined in subgroupings to the control rod extension 50.

In addition to the flow holes 52, the alignment and seal plate 22 also has openings 54 through which the control rods pass. Control rod shroud tubes 56 pass through the outlet plenum 26 and may be welded to the alignment and seal plate 22 and the boundary plate structure 24. These shroud tubes surround and protect the control rods from the effects of cross flow through the plenum 26, and also are open to a pressurized chamber 72 above the boundary plate 24.

The boundary plate 24 is supported from barrel 60 which is supported by flanges 62 resting on flanges 20 of the core support barrel. The upper guide structure support plate 64 is open to permit flow therethrough.

A flow opening 70 is provided through the core support barrel and also through the upper guide assembly barrel so that a second minor portion of the flow entering the reactor vessel passes into the top chamber 72. The flow then passes downwardly through the control rod shroud tube 56 into a pressurized chamber 73 and then through the fuel assembly control rod guide tubes 40. This second minor portion of flow continues through the length of the fuel assemblies inside the guide tube to a location near the bottom of core 12 where it passes outwardly joining the first main portion of flow. These two flows are then combined and the total quantity passes upwardly through the core 12 and outlet plenum 26.

It can be seen that two parallel flow paths exist between the inlet 8 and the bottom of core 12. The pressure drop is essentially established by the larger first portion of flow passing down through the annular space 28. The remaining portion of the flow passing through the other path experiences the same pressure drop with the flow being established by the geometry of the flow path. It is preferred that the portion of this flow path from the inlet 8 to the top chamber 72 be of low resistance and, therefore, have a relatively low pressure drop. The portion of the minor flow path through the guide tubes 40 should have a major portion of the available pressure drop. This tends to maintain the pressure in the pressurized chamber 73 at a relatively high pressure level.

Pressure plate 75 is attached to the upper end of guide tubes 40. The pressure plate has vertically upwardly extending lips 77 which extend into slots 79 which are formed in the alignment and seal plate 22. These lips are in close sealing contact with the alignment plate so that a pressurizable plenum 73 is defined by the upper surface of the pressure plate 75 and the lower surface of the seal plate 22. By maintaining the pressure drop in the control rod guide tubes 40 at a relatively high level the pressure in the pressurized plenum 73 approaches the pressure at reactor vessel inlet 8. The upper side of seal plate 75 is exposed to this pressure. The lower surface of seal plate 75 is exposed to the fluid pressure at the upper end of fuel assemblies 14. The fluid from this location passes through the openings 52 into outlet plenum 26 and out through reactor vessel outlet 10. The pressure under pressure plate 75 is, therefore, relatively low. The high pressure above the pressure plate 75 and the low pressure below cooperate to supply a downward force on the fuel assembly 14. For a pressure difference of 70 kilopascales this force would be approximately 2200 newtons.

The pressure plate may have a flow opening 79 in the center thereof and in vertical alignment with the opening 52 in the sealing plate. An upwardly extending lip 81 is in closely spaced relationship with the portion of the seal plate surrounding the opening to substantially restrict flow therethrough, thereby retaining substantial pressure in the pressurizable plenum 73.

The fuel assembly 14 rests on the support structure 16 and because of differential expansion there will be some movement between the pressure plate 75 and the seal plate 22. Therefore, a sliding seal arrangement is effected between the lip 77 and the seal plate. The effectiveness of the invention is improved by significant flow restriction at the seal, and the leakage is further minimized since the effluent from slot 79 passes downwardly where it must flow against the velocity head of the upward flow through the reactor. Since the flow leaving the fuel assemblies need not pass over the hold-down springs of alternate designs there is less potential for vibration and less pressure drop in passage of fluid through the core. Furthermore, the height required for the hold-down structure is less than that of some of the designs which require very large springs.

The uplift forces on the fuel assemblies are a function of the flow through the core. In this invention the hold-down force is also a function of the flow through the core, and, therefore, the two forces are self-compensating. This provides more tolerance in the event that flow or pressure drop varies from that predicted.

Figure 4:
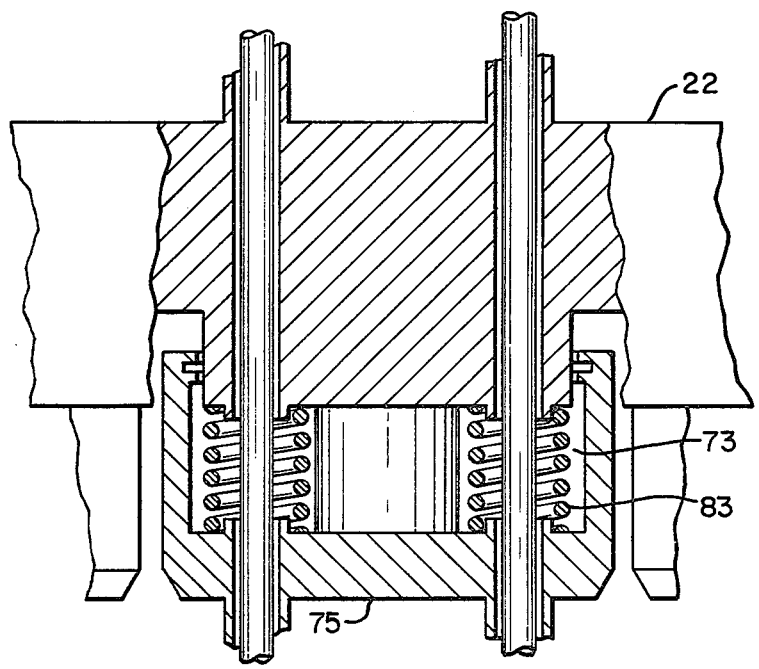
FIG. 4 illustrates an alternate embodiment where springs supplement the hold-down force and FIG. 5 illustrates an alternate embodiment wherein the hydraulic hold-down is effected at the bottom of the fuel assembly.

FIG. 4 illustrates an alternate embodiment where the hydraulic forces alone are not considered sufficient to restrain the fuel assemblies from upward movement. Supplementary springs 83 are added in the pressurized chamber 73. The spring presses upwardly against seal plate 22 and downwardly on seal plate 75 of the fuel assembly 14.

The only flow passing near the springs is the downward flow into the control rod guide tubes 40, and the only flow passing over the springs is that due to leakage through the seals. The springs, therefore, are not exposed to the high flow velocities of conventional designs and vibration problems are thereby minimized.

Figure 5:
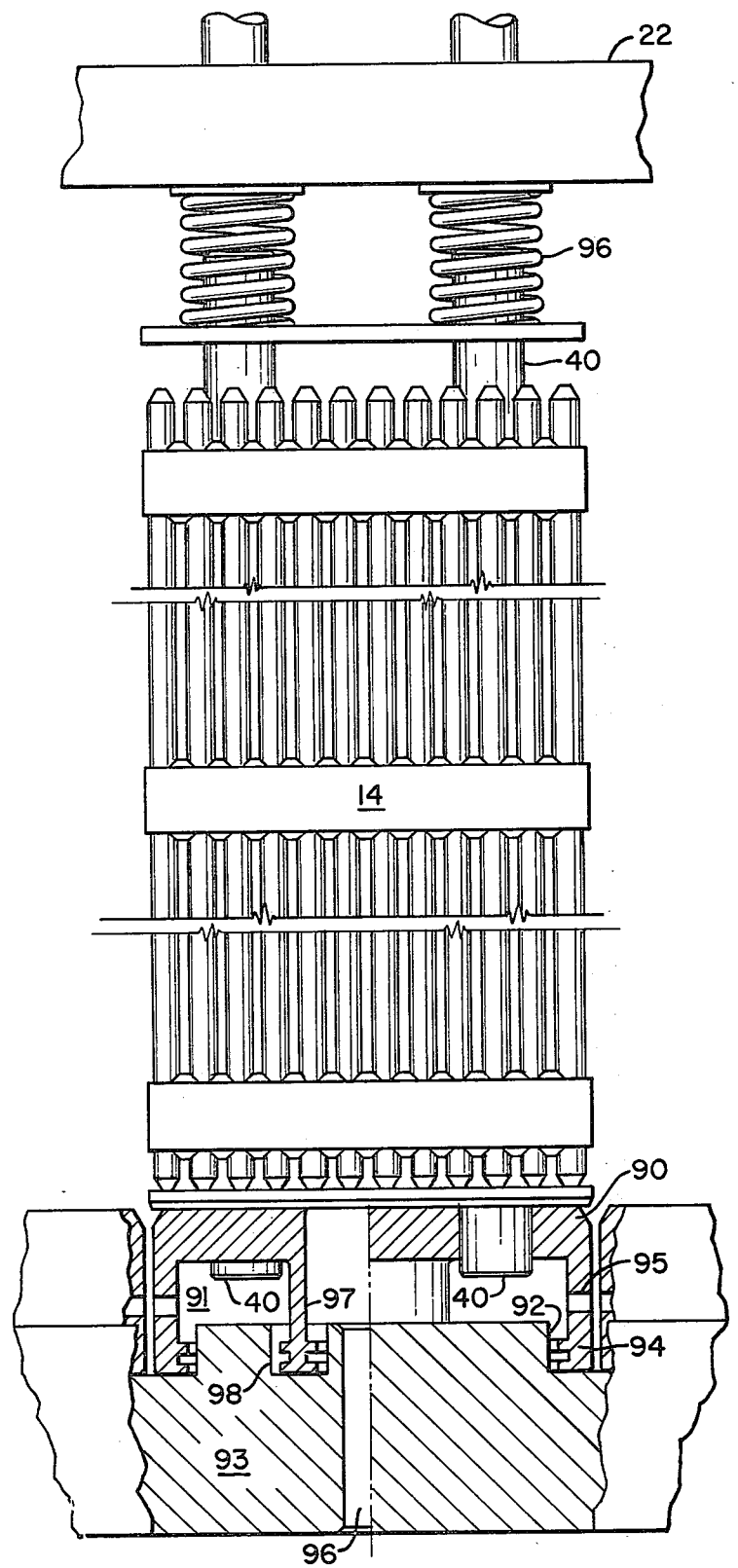

Another alternate embodiment of the invention is illustrated in FIG. 5. This embodiment is used with a reactor arrangement which does not have the flow opening 70 through the core support barrel and the upper guide assembly barrel. In such an arrangement the pressure in the top chamber 72 approximates outlet pressure from the reactor rather than inlet pressure. The control rod guide tubes 40 may be terminated just below the alignment and seal plate 22 as illustrated in FIG. 5 or they may be continued upwardly into the top chamber 72. In either case, the tubes are open to a fluid pressure which approximate the outlet pressure from the reactor. The lower end of the guide tubes 40 extend through the seal plate 90 and are exposed to the pressurizable chamber 91. Slots 92 are provided in the core support structure 93 and the pressure plate 90 has downwardly extending lips 94 extending into the slots in sealing relationship.

Since the main flow of coolant is upwardly across the fuel assemblies 14, the pressure at the lower end of the fuel assemblies is higher than the pressure at the upper end. This high inlet pressure operates on the upper surface of the pressure plate 90. Depending on the amount of flow past the seal, openings 95 may be provided through the seal plate structure, to permit additional flow to pass into chamber 91 and up through control rod guide tubes 40 in a total amount sufficient to cool the control rod fingers. A substantial amount of the flow restriction is provided in these openings 95 so that the pressure in the pressurizable plenum 91 approximates that at the outlet of the control rod guide tubes. It follows that a low pressure exists below the seal plate 90 and a relatively high pressure exists above the seal plate. This pressure differential operates to hold-down the fuel assembly 14. Supplementary springs 96 may be provided between the upper portion of the fuel assembly and the alignment and seal plate 22.

A flow opening 99 may be provided as a flow path for the main coolant flow to the core. The low pressure chamber 91 is sealed around the periphery of the opening by downwardly extending lips 97 which engage the edges of slot 98 in the support and seal plate 93.

What is claimed is:

1. In a nuclear reactor having a pressure vessel and a core within the pressure vessel, said core comprised of a plurality of fuel assemblies each comprised of a plurality of vertically oriented fuel elements, the reactor having fluid under pressure passed upwardly over said fuel elements; the improvement comprising: a pressure plate attached to the upper end of a fuel assembly, and integral therewith and having an upper surface and a lower surface; said lower surface exposed to the fluid at the fuel assembly outlet, and means for exposing said upper surface to the fluid at a pressure greater than the fuel assembly outlet pressure from a location upstream with respect to fluid flow of said fuel assemblies a sealing core plate spaced above said pressure plate and in sealing engagement with the periphery thereof so as to form a pressurizable plenum defined by the upper surface of said pressure plate and the lower surface of said seal plate.

2. An apparatus as in claim 1 having also: portions of said seal plate peripherally engaging the outer portion of said pressure plate in closely spaced relationship for substantially restricting fluid flow therebetween, thereby forming a pressurizable plenum defined by the upper surface of said pressure plate and the lower surface of said seal plate.

3. An apparatus as in claim 2 wherein said seal plate has slots therein; said pressure plate having vertically upwardly extending lips at the outer periphery thereof extending into the slots of said seal plate.

4. An apparatus as in claim 2 wherein said reactor vessel has an inlet opening and an outlet opening for the passage of fluid under pressure through the reactor vessel and having: means for conveying fluid from the inlet to the lower end of said fuel assemblies prior to traverse of the fuel assemblies; and means for independently conveying fluid from the inlet directly to said plenum.

5. An apparatus as in claim 4 wherein the fuel assembly includes a control rod guide tube extending vertically through said fuel assembly and said pressure plate, said control rod guide tube open to said pressure plenum at the upper end and open to the fluid flowing upwardly at the lower end of said fuel assemblies.

6. An apparatus as in claim 5 having also a spring means, said spring means located intermediate said pressure plate and said seal plate, and urging said pressure plate downwardly away from said seal plate.

7. An apparatus as in claim 5 wherein said pressure plate has a flow opening in the center thereof, and said sealing plate has a flow opening in vertical alignment therewith, the portion of said seal plate surrounding the opening therein being in closely spaced relationship with the portion of said pressure plate surrounding the opening therein, for substantially restricting fluid flow therebetween.

* * * * *